UNITED STATES PATENT OFFICE.

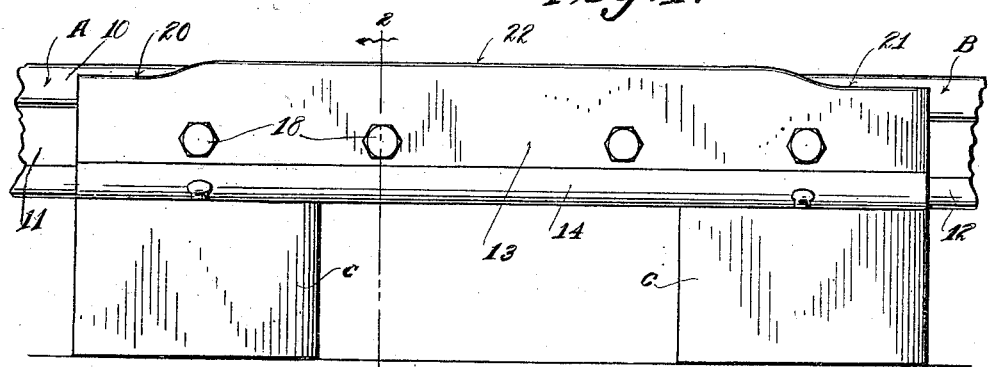
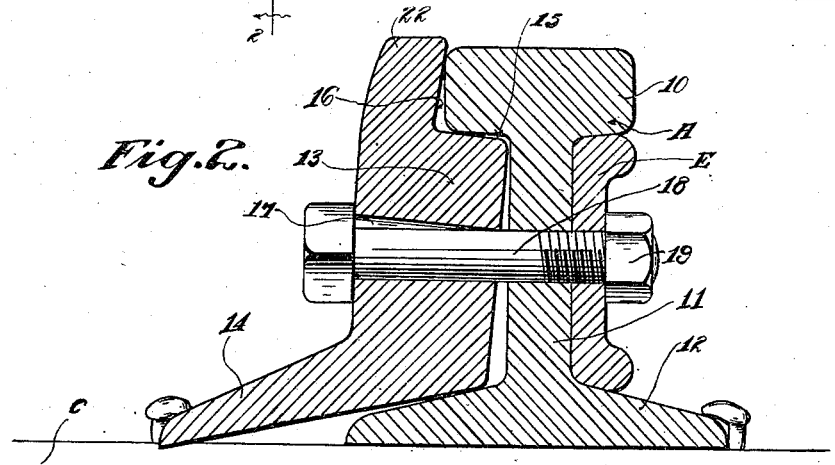
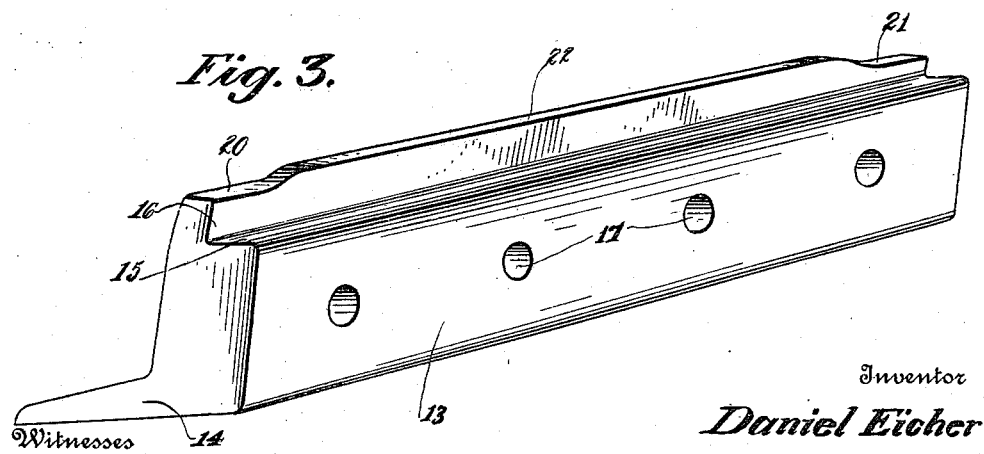
D. EICHER.
FISH PLATE.
APPLICATION FILED FEB. 1, 1911.
989,491. Patented Apr. 11, 1911.
Inventor
Daniel Eicher ated Apr. 11, 1911.

DANIEL EICHER, OF BREWSTER, KANSAS.

FISH-PLATE.

989,491.

Specification of Letters Patent. Patented Apr. 11, 1911.

Application filed February 1, 1911. Serial No. 605,921.

*To all whom it may concern:*

Be it known that I, DANIEL EICHER, a citizen of the United States, residing at Brewster, in the county of Thomas, State of Kansas, have invented certain new and useful Improvements in Fish-Plates; and I do hereby declare the following to be a full, clear, and exact description of the invention, such as will enable others skilled in the art to which it appertains to make and use the same.

This invention relates to fish plates employed in rail joints.

The object of the invention resides in the provision of a fish plate which when associated with a rail joint will serve both to prevent undue jarring of the cars when passing over the joint and also the possibility of spreading of the rails.

With the above and other objects in view, the invention consists in the details of construction and arrangement and combination of parts to be hereinafter more fully described and particularly pointed out in the appended claims.

In describing the invention in detail, reference will be had to the accompanying drawings wherein like characters of reference denote corresponding parts in the several views; and in which, Figure 1 is a side elevation of a rail joint with the improved fish plate associated therewith: Fig. 2, an enlarged section on the line 2—2 of Fig. 1; and Fig. 3, a detail perspective view of the fish plate.

Referring to the drawing, A and B indicate the adjacent ends of a pair of rails which are supported upon ties C. The rails A and B each include the usual balls 10, webs 11 and bases 12.

One of the fish plates illustrated in the drawings comprises a vertical portion 13 which terminates at its lower end in a laterally directed flange 14. The vertical portion 13 has formed at the upper end of its inner side face a recess 15, the side wall 16 of which is disposed at an acute angle to the bottom wall of said recess, so that said side wall of the recess will engage the balls of the rails A and B at its upper edge and diverge from said balls downwardly.

The flange 14 is of such a length and is so disposed with respect to the vertical portion 13 of the fish plate that it will engage the ties C so as to maintain that portion of the side face of the vertical portion 13 which is adjacent the webs of the rails A and B out of engagement with said webs. The vertical portion 13 of the fish plate is provided with a plurality of transverse bolt receiving apertures 17 which converge inwardly so as to permit a relative movement between the fish plate and bolts 18 extending through said apertures and through the webs of the rails A and B and the usual fish plate E. These bolts 18 each have mounted thereon a nut 19, through the instrumentality of which the fish plates are bound to the rails A and B and the joint completed. By this construction it will be apparent that as the engagement between the outer end of the flange 14 and the tie C becomes weak, it can be readily strengthened by screwing the nuts 19 on the bolts 18. This operation will draw the lower portion of the fish plate toward the web of the rail, the diverging side face 16 of the recess 15 permitting of such movement. This movement of the fish plate will, as is apparent, force the outer edge of the flange 14 downwardly into a fresh engagement with the tie and thus produce a suitable grip between the tie and fish plate to prevent spreading of the rails at that point. The upper edge of the vertical portion 13 is curved upwardly at each end, as at 20 and 21 to form a central elevated portion 22. This elevated portion 22 extends slightly above the tread of the rail and forms a bearing for the wheels when passing over the space between the adjacent ends of said rails. This bearing of the wheels is cushioned by the engagement of the flange 14 with the tie C and therefore forms a substantially noiseless joint for the passage of a train, while the bearing furnished by the fish plate obviates the usual jolting in passing from one rail to the other.

What is claimed is:—

1. In combination with the meeting ends of a pair of rails, and ties supporting said rails, a fish plate having the upper end of its inner side face in engagement with the ball of the rail and having a laterally extending flange at its lower end in engagement with a tie and maintaining the side faces of said fish plate out of engagement with the adjacent side faces of the rail beneath the point of engagement of the upper end of said fish plate with the rail, bolts passing through said fish plate and rails, and nuts on the ends of said bolts whereby the portion of the fish plate disposed beneath the point of engagement between the upper end of said fish plate and rail may be moved toward the rail and force said flange into engagement with the tie.

2. In combination with the meeting ends of a pair of rails, and ties supporting said rails, a fish plate having a recess in the upper end of its inner side face receiving the ball of the rail, the side wall of said recess engaging the rail at its upper end and diverging therefrom downwardly, a laterally extending flange on the lower end of said fish plate in engagement with the tie and maintaining the side face of said fish plate out of engagement with the web of the rail, bolts passing through said fish plate and rails, and nuts on the ends of said bolts, whereby the portion of the fish plate disposed beneath the point of engagement between the upper face and the rail ball may be moved toward the rail and force said flange into engagement with the tie.

In testimony whereof, I affix my signature, in presence of two witnesses.

DANIEL EICHER.

Witnesses:
PETER EICHER,
F. H. DRESSLER.

Copies of this patent may be obtained for five cents each, by addressing the "Commissioner of Patents, Washington, D. C."